United States Patent
Saarnivala et al.

(10) Patent No.: US 11,627,177 B2
(45) Date of Patent: Apr. 11, 2023

(54) LIFETIME-BASED DEVICE REGISTRATION CONTROL

(71) Applicants: ARM IP LIMITED, Cambridge (GB); ARM LIMITED, Cambridge (GB)

(72) Inventors: Mikko Johannes Saarnivala, Oulu (FI); Szymon Sasin, Oulu (FI); Yongbeom Pak, Oulu (FI); Hannes Tschofenig, Tirol (AT)

(73) Assignees: Arm IP Limited, Cambridge (GB); Arm Limited, Cambridge (GB)

( * ) Notice: Subject to any disclaimer, the term of this patent is extended or adjusted under 35 U.S.C. 154(b) by 0 days.

(21) Appl. No.: 17/310,365

(22) PCT Filed: Jan. 9, 2020

(86) PCT No.: PCT/GB2020/050045
§ 371 (c)(1),
(2) Date: Jul. 29, 2021

(87) PCT Pub. No.: WO2020/157451
PCT Pub. Date: Aug. 6, 2020

(65) Prior Publication Data
US 2022/0103656 A1 Mar. 31, 2022

(30) Foreign Application Priority Data
Feb. 1, 2019 (GB) ...................... 1901418

(51) Int. Cl.
*H04L 67/01* (2022.01)
*H04W 4/70* (2018.01)
*H04L 69/321* (2022.01)

(52) U.S. Cl.
CPC ............ *H04L 67/01* (2022.05); *H04L 69/321* (2013.01); *H04W 4/70* (2018.02)

(58) Field of Classification Search
CPC ......... H04L 67/42; H04L 69/321; H04W 4/70
See application file for complete search history.

(56) References Cited

U.S. PATENT DOCUMENTS 10,630,642 B2 * 4/2020 Clark ................... G06F 21/606
2012/0058764 A1 3/2012 Kang et al.
(Continued)

FOREIGN PATENT DOCUMENTS

GB 2540989 2/2017
WO 2015/139119 A1 9/2015
(Continued)

OTHER PUBLICATIONS

Open Mobile Alliance, "Lightweight Machine to Machine Technical Specification: Core", Version 1.1, published Jun. 12, 2018, OMA, dated Jul. 2019.
(Continued)

*Primary Examiner* — Blake J Rubin
(74) *Attorney, Agent, or Firm* — Patterson Thuente, P.A.

(57) ABSTRACT

Broadly speaking, embodiments of the present technique provide methods, apparatuses and systems for operating a server in communication with a network-attachable electronic device, comprising: storing, in storage accessible by the server, a device registration and a registration lifetime value for the device; receiving at least one message from the device; analysing the message to derive a confidence modifier associated with a message type associated with that message; applying the derived confidence modifier to a calculation of a confidence score for the device; and responsive to the calculation, determining whether a stored registration lifetime value for the device is to be adjusted based upon the confidence score.

19 Claims, 6 Drawing Sheets

(56) References Cited

U.S. PATENT DOCUMENTS

| | | |
|---|---|---|
| 2013/0265990 A1 | 10/2013 | Lee et al. |
| 2015/0163110 A1* | 6/2015 | Demo ................ H04L 43/04 709/224 |
| 2016/0277391 A1* | 9/2016 | Choyi ................ H04L 63/062 |
| 2016/0373418 A1* | 12/2016 | Ståhl ................ H04L 63/08 |
| 2017/0063931 A1* | 3/2017 | Seed ................ H04W 12/086 |
| 2017/0161615 A1* | 6/2017 | Gordon ................ G06N 20/00 |
| 2018/0324671 A1* | 11/2018 | Palnati ................ H04M 15/66 |
| 2019/0034920 A1* | 1/2019 | Nolan ................ H04L 9/0822 |
| 2019/0132236 A1* | 5/2019 | Rahman ................ H04L 67/12 |
| 2019/0140919 A1* | 5/2019 | Smith ................ H04L 41/5019 |
| 2019/0141536 A1* | 5/2019 | Bachmutsky ......... H04W 12/66 |
| 2019/0173880 A1* | 6/2019 | Nakhjiri ................ H04L 63/10 |
| 2020/0084202 A1* | 3/2020 | Smith ................ H04L 67/12 |
| 2020/0162890 A1* | 5/2020 | Spencer ................ H04L 67/303 |
| 2021/0026904 A1* | 1/2021 | Ly ................ G06F 16/951 |
| 2021/0203733 A1* | 7/2021 | Oittinen ................ H04L 67/12 |
| 2021/0297309 A1* | 9/2021 | Zhang ................ H04W 4/70 |
| 2021/0306831 A1* | 9/2021 | Seed ................ H04W 28/0268 |
| 2021/0342163 A1* | 11/2021 | Ocak ................ G06F 9/4416 |
| 2021/0409922 A1* | 12/2021 | Keränen ................ H04W 60/04 |
| 2022/0029994 A1* | 1/2022 | Choyi ................ H04W 48/18 |

FOREIGN PATENT DOCUMENTS

| | | | | |
|---|---|---|---|---|
| WO | WO-2018232304 A1 | * | 12/2018 | ......... H04L 63/0807 |
| WO | WO-2019147311 A1 | * | 8/2019 | ......... G01N 33/0031 |

OTHER PUBLICATIONS

Combined Search and Examination Report corresponding to GB 1901418.2, dated Jul. 31, 2019.

International Preliminary Report on Patentability corresponding to PCT/GB2020/050045, dated Aug. 12, 2021.

International Search Report and Written Opinion corresponding to PCT/GB2020/050045, dated Mar. 23, 2020.

* cited by examiner

LIFETIME-BASED DEVICE REGISTRATION CONTROL

The present techniques generally relate to electronic device registration according to protocols for machine-to-machine communication, and particularly to the control of the lifetime of such registrations.

There are ever increasing numbers of devices within the home, other buildings or the outdoor environment that have processing and communication capabilities which allow them to communicate with other entities (e.g. devices, servers, services etc.) within the same network or on a different network (e.g. on the internet) to access servers or services as part of the "Internet of Things", whereby data is generally transmitted between devices and other entities using machine-to-machine (M2M) communication techniques.

For example, a temperature device in a home may gather sensed data and push the sensed data to a remote service (such as an application running in 'the cloud'). The temperature device may then be controlled remotely by the remote service via received command data.

In other examples, a pollution monitoring device in a factory may comprise a sensor to gather information from various chemical sensors and arrange maintenance based on the gathered information; whilst a healthcare provider may use devices comprising sensors, such as a heart rate monitor to track the health of patients while they are at home.

The present applicant has recognised the need for improved electronic device registration according to protocols for machine-to-machine communication, and particularly to the control of the lifetime of such registrations.

According to a first technique there is provided a machine-implemented method for operating a server in communication with a network-attachable electronic device, comprising: storing, in storage accessible by the server, a device registration and a registration lifetime value for the device; receiving at least one message from the device; analysing the message to derive a confidence modifier associated with a message type associated with that message; applying the derived confidence modifier to a calculation of a confidence score for the device; and responsive to the calculation, determining whether a stored the registration lifetime value for the device is to be adjusted based upon the confidence score.

In a hardware approach, there is provided electronic apparatus comprising logic elements operable to implement the methods of the present technology. In another approach, the computer-implemented method may be realised in the form of a computer program product, tangibly stored in a non-transitory storage medium, and operable in use to cause a computer system to perform the process of the present technology.

The techniques are diagrammatically illustrated, by way of example, in the accompanying drawings, in which.

Broadly speaking, embodiments of the present technique provide methods, apparatuses and systems for the control of electronic device registration according to protocols for machine-to-machine communication, and particularly to the control of the lifetime of such registrations. Lifetimes, according to embodiments, rather than being fixed, may be extended or shortened according to various criteria associated with the messages being communicated by the registered device.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

Data exchange between programs and computers is a vital element. Different programs, computers and processors may exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may send an HTTP request to a server which responds with another HTTP message.

Figure 1:
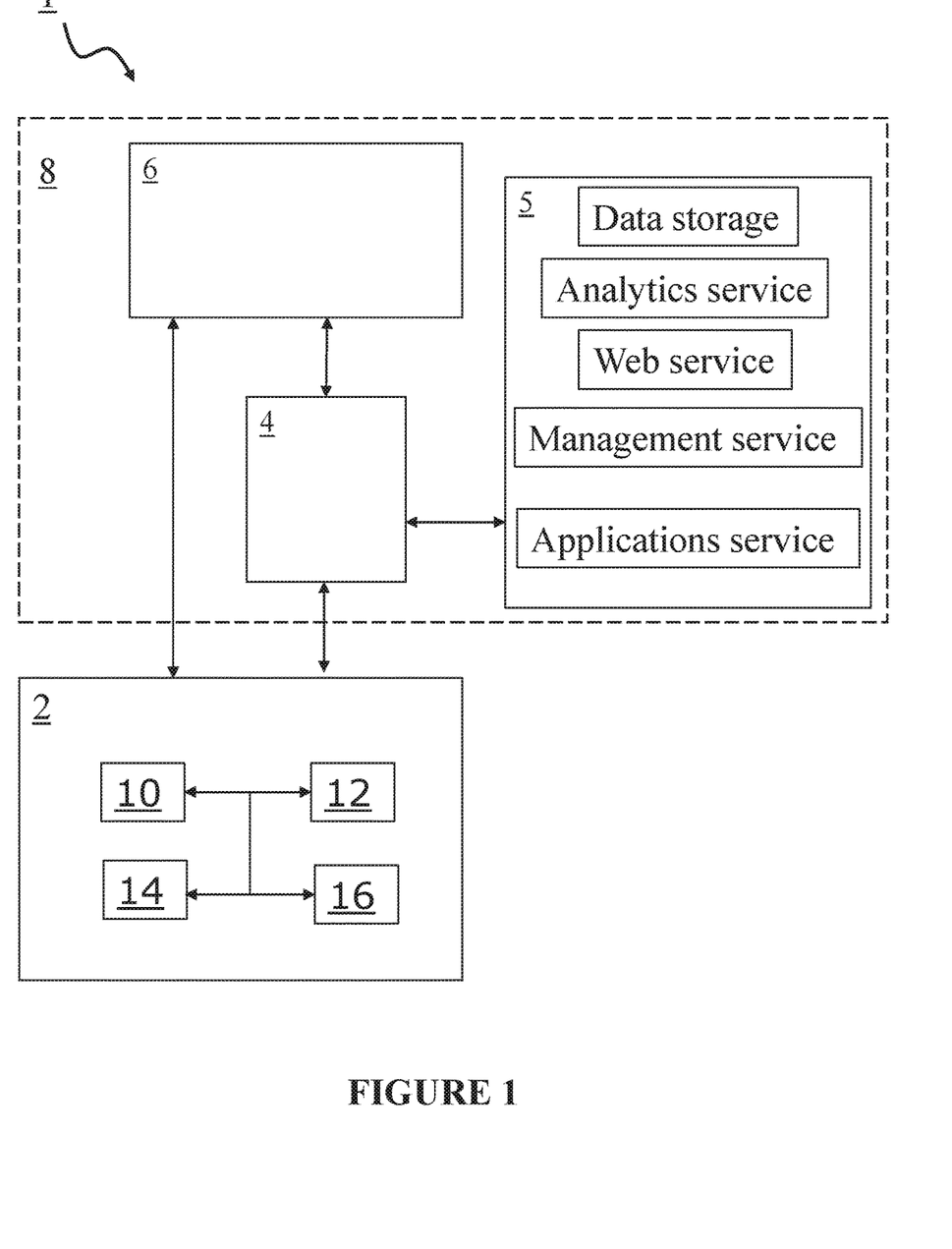
FIG. 1 shows an example deployment scenario 1 for a device 2 according to the present techniques.

FIG. 1 shows a deployment scenario 1 for a device 2 according to the present techniques.

Device 2 may be a computer terminal, a laptop, a tablet or mobile-phone, or may, for example, be a lightweight M2M (LwM2M) device running an LwM2M client. Device 2 can be used to provide smart functionality for streetlights, electric meters, temperature sensors and building automation, healthcare, and a range of other market segments as part of the IoT. It will be appreciated that the examples of market segments listed above are for illustrative purposes only and the claims are not limited in this respect. Device 2 is operable to communicate with one or more servers and/or services.

As described herein a server (depicted in FIG. 1 as "server 4", "server 6") may be a single computing device or software running on a computing device. However, the claims are not limited in this respect and the server may comprise a plurality of interconnected computing devices (or software running on a plurality of interconnected devices), whereby the plurality of interconnected computing devices may be distributed over one or more public and/or private networks.

In the present figures server 4 may, for example, be a LwM2M server, an application server, an edge server, a computer terminal, a laptop, a tablet or mobile-phone, or an application hosted on a computing device, and which provides deployment of one or more services (depicted in FIG. 1 as "service 5"). Such services may include one or more of:

web service(s); data storage service; analytics service(s), management service(s) and application service(s), although this list is not exhaustive.

In the present figures server 6 comprises a bootstrap server which is used to provision resources on the device 2. In embodiments, bootstrap server 5 may be any type of server or remote machine and may not necessarily be a dedicated bootstrap server. Generally speaking the bootstrap server 6 is any means suitable to perform a bootstrap process with the device 2 (e.g. machine, hardware, technology, server, software, etc.).

In the present examples, the server 4, bootstrap server 6 and/or services 5 are depicted as part of a device management platform 8, such as the Pelion™ device management platform from Arm®, Cambridge, UK.

The device 2 comprises communication circuitry 10 for communicating with the one or more servers 4 and/or services 5.

The communication circuitry 10 may use wireless communication, such as communication such as, for example, one or more of: wireless local area network (Wi-Fi); short range communication such as radio frequency communication (RFID); near field communication (NFC); communications used in wireless technologies such as Bluetooth®, Bluetooth Low Energy (BLE); cellular communications such as 3G or 4G; and the communication circuitry 10 may also use wired communication such as a fibre optic or metal cable. The communication circuitry 10 could also use two or more different forms of communication, such as several of the examples given above in combination.

It will be appreciated that the device 2 could also use any suitable protocols for communications including one or more of: IPv6, IPv6 over Low Power Wireless Standard (6LoWPAN®), Constrained Application Protocol (CoAP), Message Queuing Telemetry Transport (MQTT), Representational state transfer (REST), HTTP, WebSocket, ZigBee®, and Thread®, although it will be appreciated that these are examples of suitable protocols.

As an illustrative example, CoAP defines the message header, request/response codes, message options and retransmission mechanisms, such as, for example, Representational State Transfer (RESTful) Application Programming Interfaces (APIs) on resource-constrained devices and supports the methods of GET, POST, PUT, DELETE, which can be mapped to methods of the HTTP protocol.

M2M communications are typically required to be secure to reduce the risk that malicious third parties gain access to the data, or to limit the access to data, by devices, servers or services. The device may use one or more security protocols to establish a communications path or channel for providing secure communications between entities. Exemplary security protocols may, for example, comprise Transport Layer Security (TLS) and Datagram Transport Layer Security (DTLS), whereby TLS/DTLS may be used to establish a secure channel between the device 2 and server 4 whereby TLS/DTLS include establishing communications using, certificates (e.g. X.509 certificates) and both pre-shared key and public key technology. The data (e.g. credential data) protected by TLS/DTLS may be encoded as plain text, binary TLV, JSON, CBOR, or any other suitable data exchange format.

The device 2 further comprises processing circuitry 12 for controlling various processing operations performed by the device 2.

The device 2 may further comprise input/output (I/O) circuitry 14, such that the device 2 can receive inputs (e.g. user inputs, sensor inputs, measurement inputs etc.) and or generate outputs (e.g. audio/visual/control commands etc.).

The device 2 further comprises storage circuitry 16 for storing resources, such as credential data, whereby the storage circuitry 16 may comprise volatile and/or non-volatile memory.

Such credential data may include one or more of: certificates, cryptographic keys (e.g. shared symmetric keys, public keys, private keys), identifiers (e.g. direct or indirect identifiers) whereby such credential data may be used by the device to authenticate (e.g. connect, establish secure communications, register, enrol etc.) with one or more remote entities (e.g. a bootstrap server/server/services).

Figure 2A:
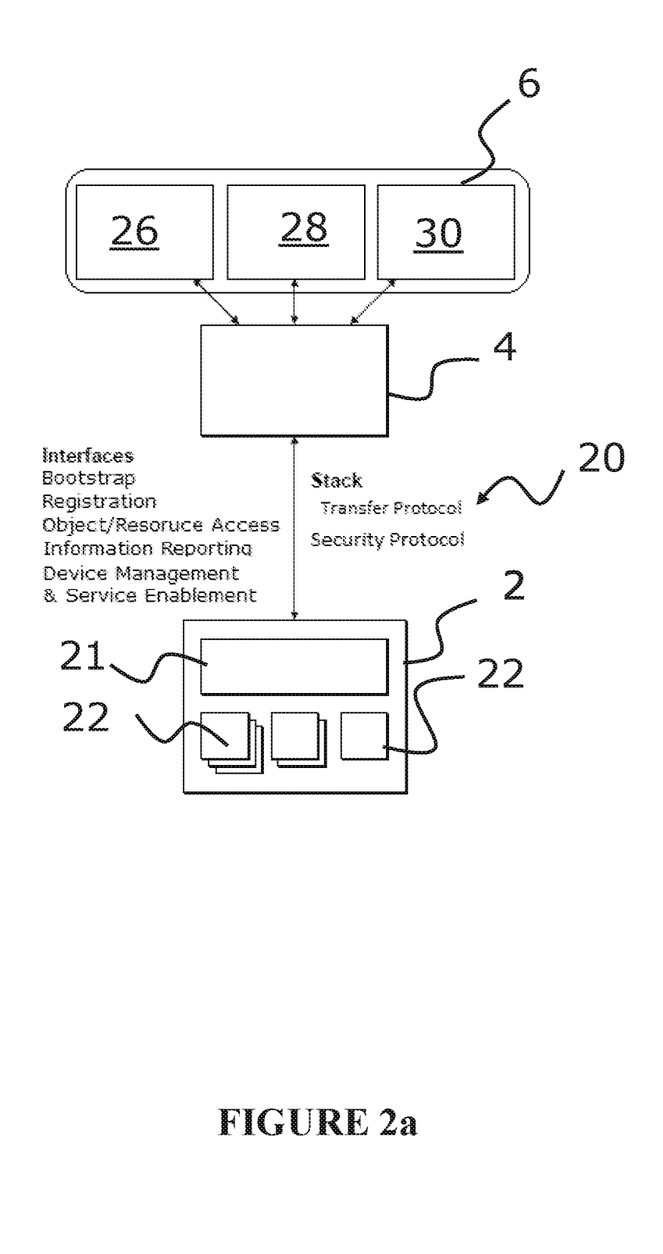
FIG. 2*a* shows an example architecture depicting a client-server relationship between the device of FIG. 1 and a server.
Figure 2B:
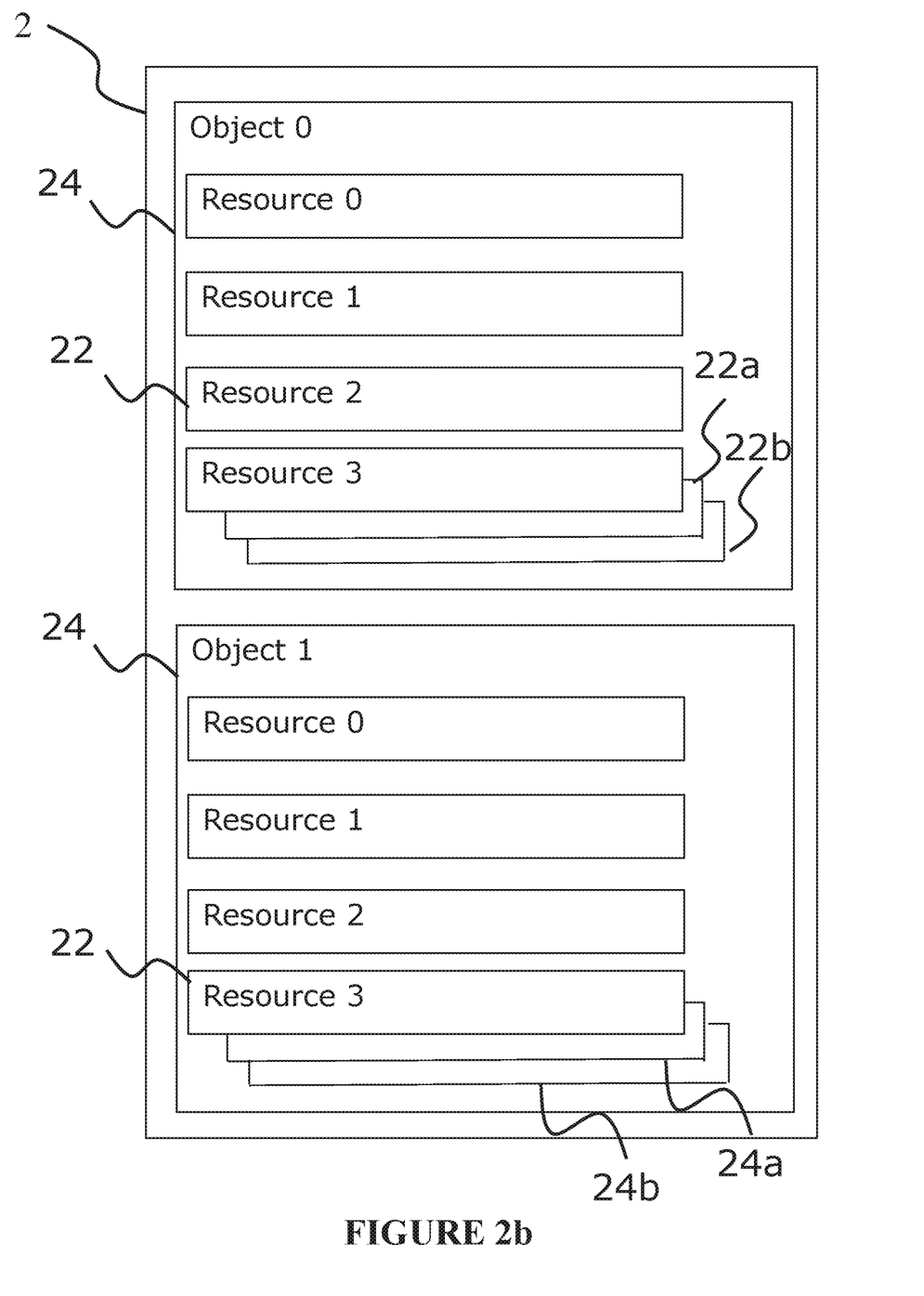
FIG. 2*b* shows a schematic diagram of an object model on the device of FIG. 1.

FIG. 2a illustratively shows an example architecture 20 which illustrates a client-server relationship between the device 2 and server 4. FIG. 2b illustratively shows a schematic diagram of an object model on device 2.

Device 2 is hereafter referred to as "client device" but may also be referred to herein as a 'device', 'node device', 'node', 'end-user device' or 'user device'.

In the following examples the server 4 is depicted as a LwM2M server, such that the LwM2M server 4 and client device 2 communicate using protocols compliant with the Open Mobile Alliance (OMA) LWM2M specification.

The client device 2 comprises client 21 which may be integrated as a software library or built-in function of a module and which is used in communications with the LwM2M server 4. The client 21 may, for example, be an LwM2M client device.

Logical interfaces may be defined between the client 21 and LwM2M server 4, and three logical interfaces are depicted in FIG. 2, namely:

'Client Registration' interface may be used to perform and maintain registration with one or more LwM2M servers and de-register from one or more LwM2M servers.

'Device management and service enablement' interface may be used by one or more servers to access object instances and resources available at the client device 2.

'Information Reporting' interface may be used to enable one or more servers to observe any changes in a resource on client device 2, and for receiving notifications when new values are available.

This list of logical interfaces is exemplary only and additional, or alternative, logical interfaces between the client 21 and LwM2M server 4 may be provided, for example, in accordance with the OMA LwM2M specification.

The device 2 comprises various resources 22, which can be read, written, executed and/or accessed by the LwM2M server 4 or one or more further servers/services.

As an illustrative example, a resource may comprise a value (e.g. generated by circuitry on the device). A web application may, via LwM2M server 4, request the value from the client device 2 (e.g. with a REPORT request), whereby the requested value is read and reported back to the web application by the LwM2M server 4.

As a further illustrative example, a resource comprising credential data may be provisioned at manufacture (e.g. during a factory provisioning process) or during a communication session with a bootstrap server, and subsequently used to register with the LwM2M server 4.

As depicted in FIG. 2b, the resources 22 may be further logically organized into objects 24, whereby each device 2 can have any number of resources, each of which is associated with a respective object 24.

A set of objects for device management purposes may include, for example:

A 'security object' to handle security aspects between the client device 2 and one or more servers;

A 'server object' to define data and functions related to a server;

An 'access control object' to define for each of one or more permitted servers the access rights the one or more servers have for each object on the client device 2;

A 'device object' to detail resources on the client device 2. As an example, the device object may detail device information such as manufacturer, model, power information, free memory and error information;

A 'connectivity monitoring object' to group together resources on the client device 2 that assist in monitoring the status of a network connection;

A 'firmware update object' enables management of firmware which is to be updated, whereby the object includes installing firmware, updating firmware, and performing actions after updating firmware;

A 'location object' to group those resources that provide information about the current location of the client device 2;

A 'connection statistics object' to group together resources on the client device 2 that hold statistical information about an existing network connection.

In embodiments device 2 may have one or more instances of an object, three of which are depicted as 24, 24a and 24b in FIG. 2b. As an illustrative example, a temperature sensor device may comprise two or more temperature sensors, and the client device may comprise a different device object instance for each temperature sensor.

The objects/resources on a device may be remotely accessed/managed by, for example, software hosted on a server (e.g. a bootstrap server, LwM2M server 4) or an application running as part of a service 5.

A basic type of resource is one which may have a given value. A web application may, via LwM2M server 4, request the value from the client device (e.g. with a REPORT request), whereby the requested value is read and reported back to the web application.

In an embodiment the LwM2M server 4 comprises, or has access to a resource directory at the device management platform (not shown in FIG. 2a or 2b), whereby the resources of the various client devices registered with the LwM2M server 4 are stored in the resource directory. Thus, the resource directory is a registry of the resources on one or more client devices registered with one or more servers. In embodiments the resource directory may be realized using a processor and a storing device such as a hard disc drive and a suitable application, a database application in a computer or it may be realized using cloud computing.

In an embodiment client device 2 registers with a LwM2M server 4 by sending a registration request and providing various data, such as identifying all the resources thereon. The LwM2M server 4 stores the identified resources in the resource directory for the client device 2. Once the data is in the resource directory the data can then be looked up and resources accessed as required.

As the number of resources on a client device increases, the size of the registration message will also increase and may impact the system capacity, especially when many devices attempt to register with the LwM2M server 4 at substantially the same time.

To simplify the registration procedure and reduce the size of the registration request, the LwM2M server may use resource templates, whereby a resource template defines a specific list of resources. In an illustrative example, when a client device 2 registers with the LwM2M server 4 and the resources on that client device 2 match the resources specified in a resource template in storage on the LwM2M server (or on the device management platform), the LwM2M server 4 can store the resources identified in the resource template in the resource directory for that client device 2.

In such a scenario the client device 2 can identify the resource template by providing a template identifier in the registration request, where the template identifier is provisioned on the client device 2 by bootstrap server 6 during a bootstrap process.

Such functionality means that the client device 2 is not required to send all of its resource identifiers to the LwM2M server 4, rather it just transmits the template identifier.

Whilst the server 4 above is generally depicted as a LwM2M server, the claims are not limited in this respect and in embodiments the server 4 may be an OMA Device Management (DM), a TR-069 server or a server which follows a standard/protocol set by the Open Connectivity Foundation or Open Interconnect Consortium.

Embodiments of the present techniques may provide implementations which conform to the Open Mobile Alliance Lightweight Machine to Machine Technical Specification, Version 1.0 and to one or more revision(s) thereof, including Version 1.3.

Typically, in systems such as that contemplated in the present disclosure, a client device registers with a server for a pre-determined lifetime. Conventionally, LWM2M or IoT devices have either never had their registrations expire or they have had to use a dedicated, heartbeat-type message to inform a service or some other entity that they are still online, working as designed (to the extent this information is available), and can be contacted when needed or according to a pre-defined schedule. The third alternative that has been traditionally used is that the server/backend does not maintain any state on the device but simply receives all data from the device (either directly or via a message passing service such as message bus) when it becomes available. The third method requires very little, if any communication overhead to maintain the registration state (as it is not changed at all). However, in this method, the service/cloud/backend has no state information on the device at all.

By contrast, the present technique may make use of cross-layer messages in the networking stack to enable the server to infer the registration status of the device. The networking stack may comprise a layered stack architecture in which the various levels perform different types of physical and logical functions for the control of communications activity. There may be, for example, an application layer at the top level of such a stack architecture, while the various logical and physical transport layers are at lower levels in the stack. Typically, communications between layers in such a stack architecture are performed according to application programming interfaces exposed to one another by the entities at the various levels of the stack.

In one example of an implementation of the present technique, the method involves drawing information from non-registration messages received from a device (i.e. messages that are not directly related to the registration of a device, such as dedicated heartbeat messages). In this manner, useful information that enables inferences about device state may be extracted from different layers of the stack and messages that were intended for their original purpose only may be secondarily used to make inferences about device state and thereby efficiently adjust a device's registration lifetime at only a small cost in layer-to-layer interactions and at no additional cost in device-to-server heartbeat traffic.

Embodiments of the present technique involve establishing a confidence score for each device based on the types of message that the device sends to the server. The confidence score indicates the degree of confidence that the device's registration may continue to be valid for an extended period. For example, once the confidence score exceeds a predetermined threshold, it is possible for the server to infer that the lifetime of the registration of the device with the service should be extended. This allows the server to maintain the registration of the device with the server without the device having to transmit a dedicated, heartbeat-type message in, for example, a publish/subscribe type of message passing framework. For example, this approach can allow the restart/reset of the device registration lifetime counters in the server/cloud even in the absence of any heartbeat messages.

In one embodiment, a confidence table (in the form of, for example, a database) is maintained in communication with the server. When a message of a certain type is received from a device, the server tracks the message type of the message and identifies a confidence boost or confidence modifier which is sent to the confidence database to modify the confidence score according to the message type. To do this each message type in the different layers of the stack has an associated "confidence boost" which is effectively a confidence modifier applied to modify the confidence score according to how much trust the server has that the message indicates that the registration lifetime should be extended. The confidence modifier may also be negative, thus contributing to a corresponding shortening of the lifetime. In one implementation, a time-based modification of the confidence score may also take place, for example factoring in a periodic decay of the confidence score. Thus, for example, an initial registration may be set to have a high confidence score value that gradually decays over the lifetime of the registration.

One possible example of a confidence table is shown in Table 1.

TABLE 1

| No. | LAYER | MESSAGE | MODIFIER | NOTES |
|---|---|---|---|---|
| 1 | L1/L2 - Connectivity | Any message originating from the device that is not a low-level acknowledgement to a message directed to the device | 2% | See Note 1 below |
| 2 | L1/L2 - Connectivity | Low level (L1 or L2) acknowledgement originating from a device | 1% | See Note 1 below |
| 3 | L3 - Network | Any message from the IP address AND port number associated with the device registration to the server IP address AND port number | 10% | |
| 4 | L3 - Network | Any message from the IP address associated with the device registration (different source port number) | 5% | |
| 5 | L3 - Network | Any message from the IP address associated with the device registration (different source port number AND to nonstandard server IP address/port number) | 2% | This could indicate that the device is probably alive (no power loss, no communication failure) but may not imply that the application is working as designed. |
| 6 | L4 - Transport | UDP Ping | 2% | |
| 7 | L4 - Transport | TCP SYN | 2% | |
| 8 | L4 - Transport | TCP ACK | 2% | |
| 9 | L4 - Transport | TCP RST | −5% | |
| 10 | L4 - Transport | UDP Any other packet | 5% | Payload required |
| 11 | L7 - Application | CoAP Notification | 25% | |
| 12 | L7 - Application | CoAP Ack | 15% | |
| 13 | L7 - Application | MQTT Notification | 25% | |
| 14 | L7 - Application | CoAP Registration | 100% | |
| 15 | L7 - Application | HTTP GET/PUT/POST/DELETE | 25% | |
| 16 | L7 - Application | HTTP 1xx or 3xx | 10% | |
| 17 | L7 - Application | HTTP 2xx | 20% | |
| 18 | L7 - Application | HTTP 4xx or 5xx | −20% | |

NOTE1:
Mostly applicable to cellular networks where it could be possible to receive some out-of-band connectivity statistics about a specific device - might require mapping between subscriber IMSI and IP address (may be volatile, hence a low modifier value. Furthermore, depending on the device design/architecture this information may not tell much about how the higher layers of the device software stack are functioning.

Table 1 thus illustrates an example configuration of a confidence table that may be used to identify, for a message type, whether a modifier should be applied to the confidence score for that device. In addition to relying on the message type, the system can also factor in to the determination of the confidence score previous messages received within a predetermined time window. In various embodiments, the predefined threshold value can be defined by an administrator for a device type, a device group, a unique device, a manufacturer's devices, or all devices of a specified account. In practice, the device software may also be enabled to be aware of any implied registration and therefore readjust or delay its own registration time so that it sends a full registration update message to the server at the appropriate time. Alternatively, a mechanism may be defined by which the server can efficiently inform the device about the implied registration update.

Figure 3:
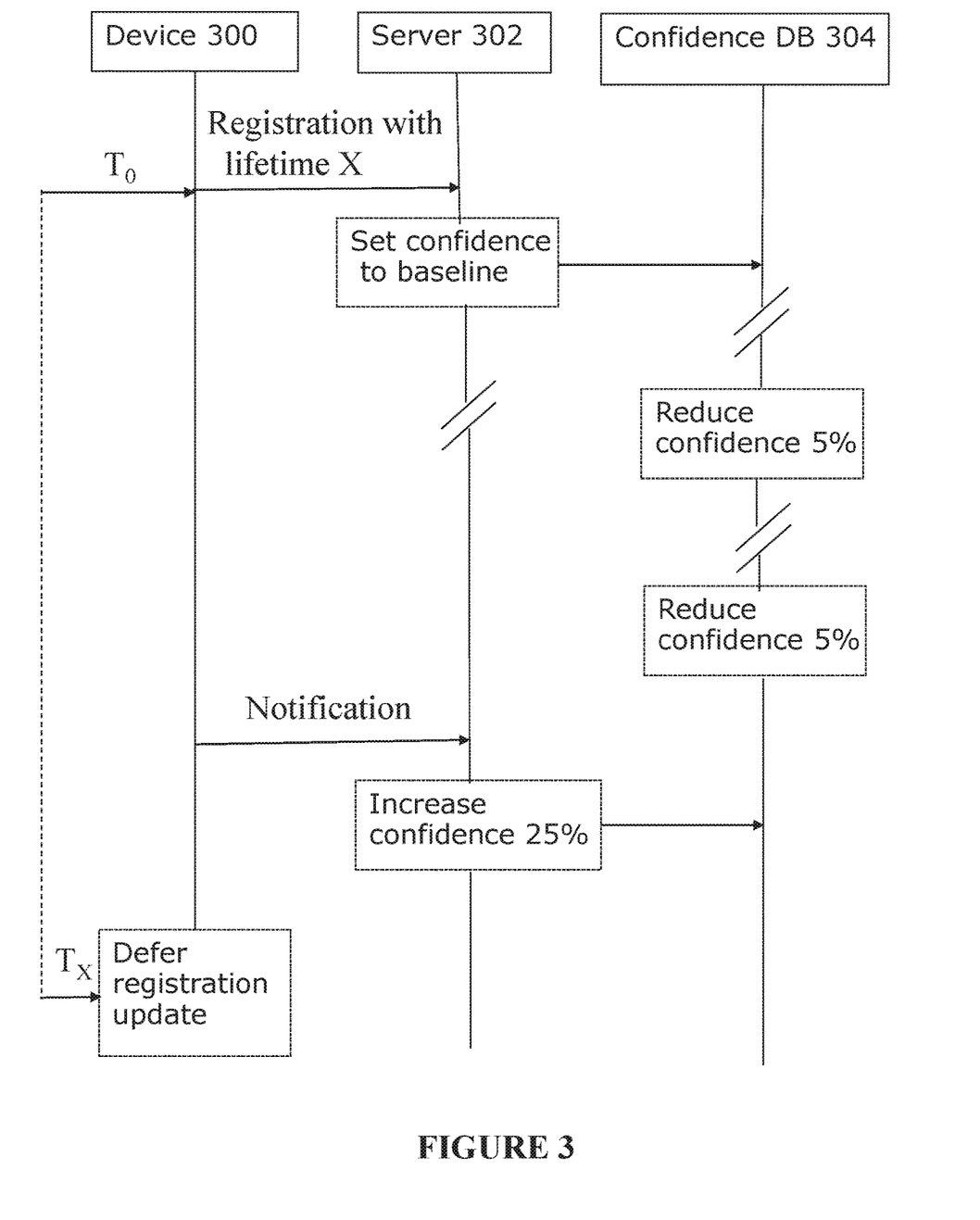
FIG. 3 shows a simplified representation of some of the communications between elements of a system according to an embodiment of the present technology.

In FIG. 3 is shown a simplified representation of some of the communications between elements of a system according to an embodiment of the present technology. As shown in FIG. 3, device 300 is registered with server 302 at time $T_0$ and the registration lifetime is set to X, so that the registration lifetime would normally expire at time $T_x$. Server 302 may, in one implementation, set the confidence score to a baseline value and store the value in confidence database 304. In this example implementation, the confidence score is set to decay automatically over time, and thus, after a first period has elapsed, the confidence score is reduced by 5%. After a second period, the score is reduced by a further 5%. In thus example, a notification message of some type is received from device 300 at server 302, and its effect (when the message type is analysed and its confidence modifier value is ascertained) is to increase the confidence score by 25%. The confidence score is now, for this example, equal to the baseline value, reduced by 10% in 5% increments and subsequently increased by 25%. In our example, this raises the confidence score above some threshold that has been set for this device (for example, by a system administrator), and thus at time $T_x$, the registration lifetime does not expire, and can be deferred by device 300.

Figure 4:
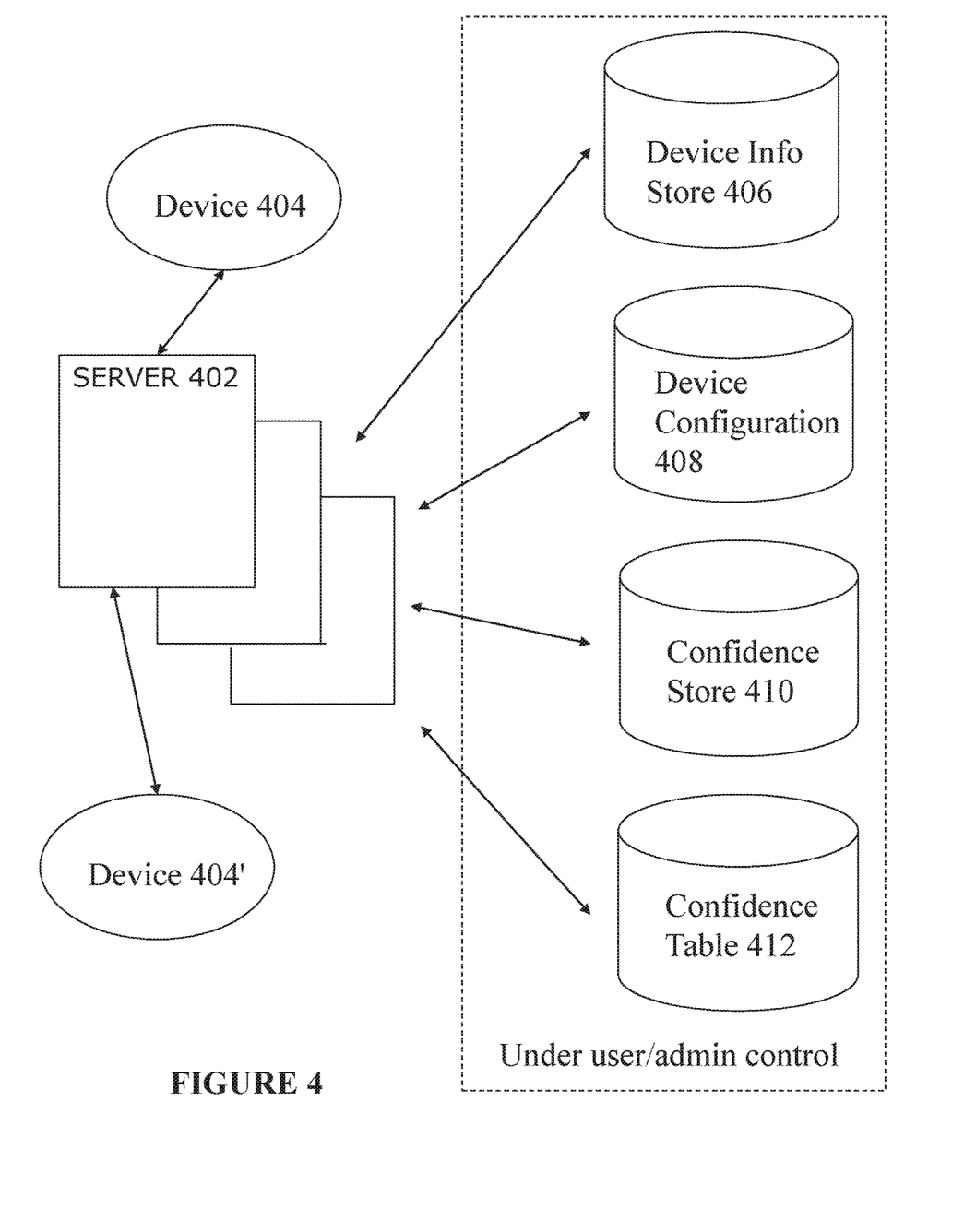
FIG. 4 shows some of the component elements of an implementation of the present technique.

In FIG. 4 are shown some of the component elements of an implementation of the present technique. Server 402 (as shown, this is an example only, and there may be many more servers in any practical system) is connected to devices 404, 404'. Again, this is an example only, and there may be many more devices in any practical system. Device information store 406 contains relatively fixed information about the device and device configuration store 408 contains more variable information, such as the specific current configuration of the device. Server 402 has access to information concerning the current configuration of the device. Server 402 also has access to confidence table 412, which, as described above, contains confidence modifier values indexed by device type, and to confidence store 410, which contains the confidence scores for devices 404, 404'.

Figure 5:
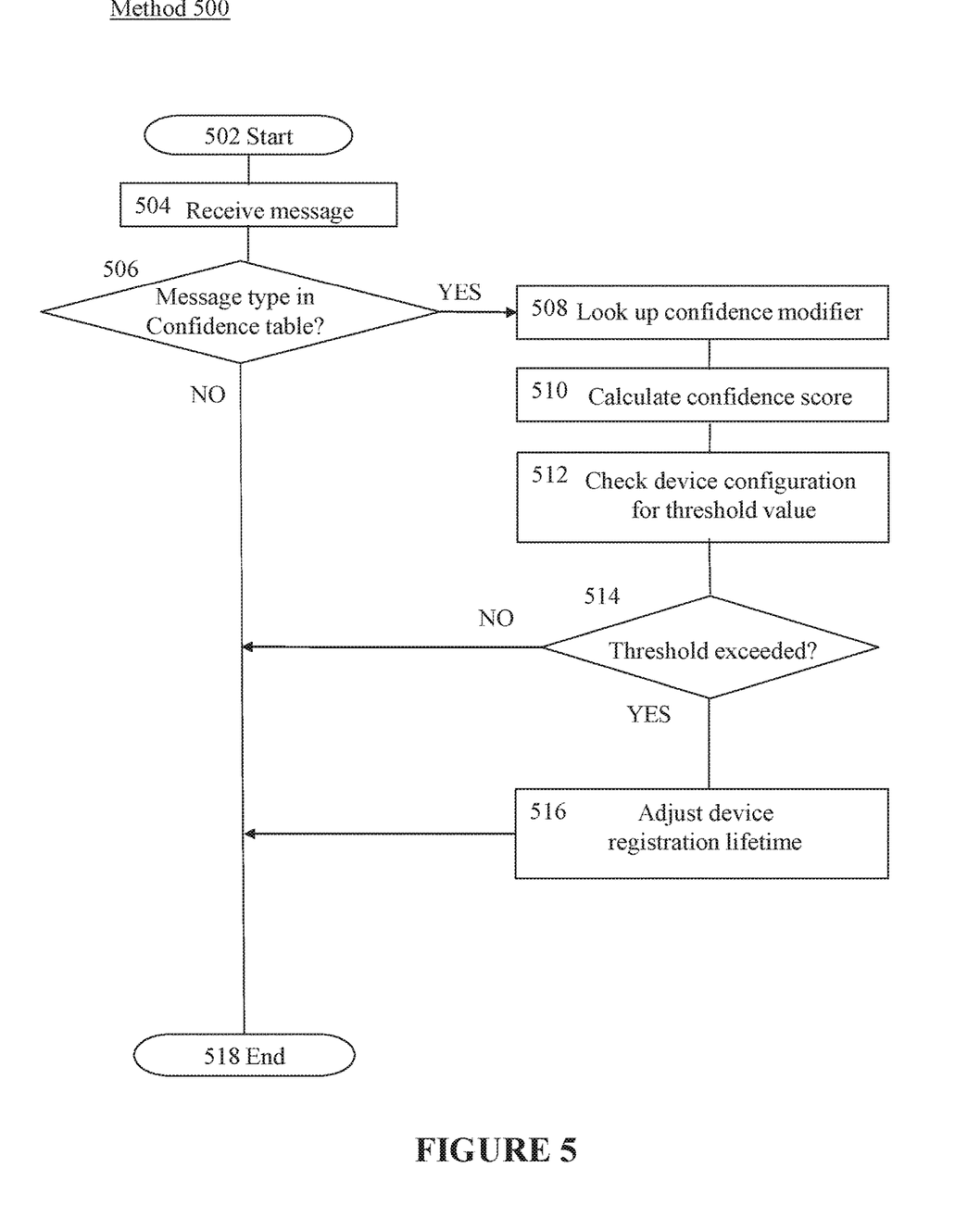
FIG. 5 shows one example of a method of operation according to an embodiment of the present techniques.

Turning now to FIG. 5, there is shown one example of a method of operation according to an embodiment of the present techniques. This example shows the method that is performed after the device has been registered and its normal registration lifetime has been set to some initial value. In the example, the method starts at 502, and at 504 a message is received. At test 506, it is determined whether the message type is stored in a confidence table (for example, a confidence table in storage as described above), and if the response to test 506 is negative (that is, the message type is not stored in the confidence table, and thus not associated with a confidence modifier), the method ends at 518. As will be clear to one of skill in the art, this end step 518 may merely terminate this instance of the method, which may be iterative. If the response to test 506 is positive (that is, the message type is stored in the confidence is table, at step 508 the server looks up the corresponding confidence modifier in the confidence table, and at 510 calculates the confidence score. The confidence score may be stored in any suitable form of storage, such as a database. At step 512 the server checks the device configuration to determine the threshold value associated with the device. At test 514, the server compares the confidence score calculated at 510 with the threshold value determined at 512, and if the threshold has not been exceeded, the method ends at 518. As will be clear to one of skill in the art, this end step 518 may merely terminate this instance of the method, which may be iterative. If at test step 514, it is determined that the threshold value determined at 512 has been exceeded, the server adjusts the device registration lifetime accordingly. This adjustment, as has been described above, may be an upward adjustment to extend the device registration lifetime, or it may be a downward adjustment, to shorten the device registration lifetime. In either case, the method ends at 518. As will be clear to one of skill in the art, this end step 518 may merely terminate this instance of the method, which may be iterative.

Thus, according to embodiments of the present technology, there is provided a machine-implemented method for operating a server (which may be an LwM2M server) in communication with a network-attachable electronic device (which may be an LwM2M client device that creates an LwM2M client). The method involves storing, in storage accessible by the server (such as a database), a device registration and a registration lifetime value for the device. The server receives at least one message from the device and analyses the message to derive a confidence modifier associated with a message type of that message. This may involve using a lookup table in which confidence modifiers are indexed by message type. The server then applies the derived confidence modifier to a calculation of a confidence score for the device. Responsive to the calculation, the server can then determine whether a stored registration lifetime value for the device is to be adjusted based upon the confidence score.

Determining whether a stored registration lifetime value for the device is to be adjusted based upon the confidence score may involve determining whether the registration value is to be extended or shortened, and may involve factoring in a time-based decay of the confidence score. The analysing, applying and adjusting may performed in an application layer of a stack architecture or in a layer below an application layer of a stack architecture. If these steps are performed in a layer below an application layer, the message may be made available to the application layer responsive to a programmatic request, defined, for example as an application programming interface. The positive result may comprise a determination that the confidence score exceeds a threshold value, which may be set according to the type of the device. Applying a derived confidence modifier to a calculation of a confidence score for the device may comprise applying a plurality of confidence modifiers to the calculation, and the plurality of confidence modifiers may be bounded by a time-window. Analysing the message to derive a confidence modifier may comprise determining a message type, and may involve referring to a table of confidence modifiers, which may be stored in a data store (for example, a database) and indexed on message type.

Embodiments of the present techniques also provide a non-transitory data carrier carrying code which, when implemented on a processor, causes the processor to carry out the methods described herein.

The techniques further provide processor control code to implement the above-described methods, for example on a general-purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object-oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, the functional data comprising functional computer data structures to, when loaded into a computer system or network and operated upon thereby, enable the computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. A machine-implemented method for operating a server in communication with a network-attachable electronic device, comprising:
    storing, in storage accessible by the server, a device registration and a registration lifetime value for the device;
    receiving at least one message from the device;
    analyzing the message to derive a confidence modifier associated with a message type associated with that message;
    applying the derived confidence modifier to a calculation of a confidence score for the device; and,
    responsive to the calculation, determining whether the stored said registration lifetime value for the device is to be adjusted based upon the confidence score;
    the method further comprising storing at a data store a data structure of confidence modifiers indexed by the message type.

2. The machine-implemented method of claim 1, the determining whether the stored registration lifetime value for the device is to be adjusted based upon the confidence score comprising determining whether the registration value is to be extended.

3. The machine-implemented method of claim 1, the determining whether the stored registration lifetime value for the device is to be adjusted based upon the confidence score comprising determining whether the registration value is to be shortened.

4. The machine-implemented method of claim 1, the determining whether the registration value is to be adjusted comprising factoring in a time-based decay of the confidence score.

5. The machine-implemented method of claim 1, the device registration comprising a LwM2M registration, the server comprising a LwM2M server, and the device comprising a LwM2M client.

6. The machine-implemented method of claim 1, the analyzing, applying and adjusting being performed in an application layer of a stack architecture.

7. The machine-implemented method of claim 1, the receiving being performed in a layer below an application layer of a stack architecture.

8. The machine-implemented method of claim 7, the message being made available from the layer below an application layer to the application layer responsive to a programmatic request.

9. The machine-implemented method of claim 8, the programmatic request being defined as an application programming interface.

10. The machine-implemented method of claim 1, the determining comprising a determination that the confidence score exceeds a threshold value.

11. The machine-implemented method of claim 10, the determination that the confidence score exceeds a threshold value comprising a determination based on a type of the device.

12. The machine-implemented method of claim 1, the applying a derived said confidence modifier to a calculation of a confidence score for the device comprising applying a plurality of the confidence modifiers to the calculation.

13. The machine-implemented method of claim 12, the plurality of confidence modifiers being bounded by a time-window.

14. The machine-implemented method of claim 1, the analyzing the message to derive a confidence modifier comprising determining a message type.

15. The machine-implemented method of claim 1, the data structure being stored as a database.

16. The machine-implemented method of claim 1, the analyzing the message to derive a confidence modifier comprising locating the confidence modifier in a data store indexed by the message type.

17. The machine-implemented method of claim 1, further comprising, responsive to an adjustment of the registration lifetime value, notifying said device.

18. A computer program comprising computer readable code to, when loaded into a computer and executed thereon, cause the computer to perform the method according to claim 1.

19. Apparatus comprising electronic logic operable to perform the method according to claim 1.

\* \* \* \* \*